United States Patent [19]
Zabiak et al.

[11] 3,903,034
[45] Sept. 2, 1975

[54] OFFSET JET PRINTING INK

[75] Inventors: Daniel M. Zabiak, Park Ridge; Earl B. Relph, Des Plaines, both of Ill.

[73] Assignee: A. B. Dick Company, Chicago, Ill.

[22] Filed: Dec. 3, 1973

[21] Appl. No.: 421,328

Related U.S. Application Data

[63] Continuation-in-part of Ser. No. 95,952, Dec. 7, 1970.

[52] U.S. Cl. ............ 260/29.6 WB; 117/15; 117/38; 117/155 UA; 260/29.6 E; 260/33.2 R; 260/42.43; 260/DIG. 38
[51] Int. Cl.² ........................................ C08L 35/06
[58] Field of Search ............ 260/29.6 RW, 29.6 WB, 29.6 E, 260/29.6 H, 29.6 NR, DIG. 38; 117/15, 38

[56] References Cited
UNITED STATES PATENTS

| | | | |
|---|---|---|---|
| 2,686,736 | 8/1954 | Kuhn | 117/38 |
| 2,795,564 | 6/1957 | Conn et al. | 260/29.6 WB |
| 2,868,741 | 1/1959 | Chambers et al. | 260/17 R |
| 3,053,779 | 9/1962 | O'Neill | 260/29.6 E |
| 3,576,915 | 4/1971 | Graham et al. | 260/29.6 RW |
| 3,687,887 | 8/1972 | Zabiak | 260/29.6 WB |
| 3,705,043 | 12/1972 | Zabiak | 106/20 |
| 3,766,116 | 10/1973 | Olhoft | 117/15 |

*Primary Examiner*—Melvin Goldstein
*Assistant Examiner*—W. C. Danison, Jr.

[57] ABSTRACT

A jet printing ink for use in the preparation of direct image offset masters comprising an aqueous alkaline solution of a water-soluble dye, a resin which is soluble in alkaline media and is hydrophobic on drying and a plasticizer for the resin system selected from the group consisting of glycols, glycol ethers and mixtures thereof.

18 Claims, No Drawings

3,903,034

OFFSET JET PRINTING INK

This is a continuation-in-part of copending application Ser. No. 95,952, filed Dec. 7, 1970.

This invention relates to printing inks, and more particularly to a new and improved printing ink for use in jet printing.

In Technical Report No. 1722-1 of the Stanford University Electronics Research Laboratory, dated March, 1964, and entitled "High Frequency Oscillography With Electrostatically Deflected Ink Jets," description is made of the early work which was done in which is now known to the art as jet printing. The basic imaging technique in jet printing involves the use of one or more ink jet assemblies connected to a pressurized source of ink. Each ink jet includes a very small orifice, usually having a diameter of the order of about 0.0024 inches, which is electromagnetical energized by magneto restrictive or piezoelectric means to emit a continuous stream of uniform droplets of ink at a rate of the order of 33 to 75 kilohertz. The stream of droplets is directed onto the surface of a moving web of, for example, paper, and is controlled to form printed characters in response to video signals derived from an electronic character generator and in response to an electrostatic deflection system.

In the early work relating to jet printing described in the above report, use was made of various types of commercially available fountain pen inks. However, generally available inks are unsuitable for use in jet printing because they frequently contain solid particles of the dye or other insoluble material contained in the ink which frequently clog the very small orifice of the ink jet.

Perhaps more importantly, commercially available inks have a tendency to "tip dry" when left in the ink jet over short periods, such as over night when the jet printer is not in use, with the result that the ink which dries in the orifice deposits solids therein to clog the orifice and prevent the flow of ink therethrough on resumption of operation of the jet printer.

It is known that humectants, such as glycerine, can be added to inks in general in order to minimize undesired drying of the ink. However, the uses of this technique is unsuitable for jet printing inks because glycerine has a high viscosity of the order of 900 centipoise and therefore cannot be used as the sole humectant in amounts sufficient to prevent undesired tip drying of jet printing inks without increasing the viscosity of the ink to the extent it will not flow through the jet properly. This problem is further compounded by the fact that jet printing inks are generally recirculated in a jet printer whereby the ink is continually subjected to a water loss through evaporation, to thereby further increase the viscosity of the jet printing ink.

In copending application Ser. No. 95,953, filed concurrently herewith, description is made of a new and improved ink composition suitable for use in jet printing in which use in made of a humectant system comprising a mixture of a lower alkoxy triglycol and another humectant such as a polyethylene glycol, a lower alkyl ether of diethylene glycol or glycerine. As described in the aforementioned application, the use of the humectant system as described substantially prevents or minimizes tip drying of the ink composition in the nozzle of a jet printer while not increasing the viscosity above the desired range of 1 to 10 centipoise at 25° C., even where the ink composition is subject to loss of water through evaporation during recirculation of the ink in the printer.

While the ink composition described in the aforementioned copending application represents a significant advance in the art of jet printing inks, such ink compositions are intended for use in preparing single copies, as opposed to multiple copies as by, for example, direct image master offset duplication of the printed image. In fact, at the present time, the only means by which computer print-out, an application for which jet printing is ideally suited by virtue of the high speed printing of which jet printer are capable, can be produced in multiple copies is to subject the original print-out to additional process steps to prepare an offset master for use in conventional duplicating process. As can be appreciated by those skilled in the art, the requirement of such additional steps necessitates the use of additional equipment and supplies and otherwise serves to make such duplication operations cumbersome.

It is accordingly an object of the present invention to provide an ink composition for use in jet printing for the production of direct image offset masters.

It is a more specific object of this invention to provide a new and improved jet printing ink composition formulated to contain a resinous system which is soluble in aqueous alkaline media and which becomes water insoluble and hydrophobic upon drying for use in preparing direct image offset master.

It is yet another object of the invention to provide a new and improved ink composition for use in printing for the preparation of direct image offset masters having a viscosity within the range of 1 to 10 centipoise at 25° C. and having a humectant system which prevents or substantially minimizes tip drying of ink composition in the nozzle of the printer.

The concepts of the present invention resides in a composition for use in jet printing for the preparation of direct image offset masters formulated of an aqueous solution of a water-soluble dye containing resin system which is soluble in aqueous alkaline media but becomes insoluble and hydrophobic upon drying and a plasticizer for the resinous system. Thus, the ink composition of the invention is aqueous in use during printing operations, but dries to form a hydrophobic image. The hydrophobic character of the image defined by the resin on a direct image master is further enhanced by reason of the fact that fountain solutions of offset presses are usually acidic to further cause insolubilization of the resin image on drying.

As the resin system, use should be made of one or more resins which is soluble in squeous alkaline media, but insoluble in acidic media. The preferred resin systems are the styrene-maleic anhydride resins including ester derivatives thereof, which are soluble in alkaline media. Suitable styrene-maleic anhydride are manufactured by Atlantic Richfield Co. under the designation "SMA" such as "SMA 1420A," "SMA 1430A," "SMA 1440A," "SMA 17352A," "SMA 2420A," and "SMA 2625A," or by Monsanto under the designations "Lytron 812," "Lytron 820," "Lytron 822," "RX 278," and "RX 279."

Another type resin which is soluble in aqueous alkaline media but insoluble in acidic media suitable for use in the practice of the invention is a carboxylated polyvinyl acetate resin. Such resins are prepared by polymerizing vinyl acetate in a conventional manner in the presence of a small amount (usually 0.1 to 15% by weight) of a carboxylic acid containing ethylenic unsaturation, such as acrylic acid, methacrylic acid, or maleic anhydride. One suitable resin is the Gelva resin C5V16.

It is possible, and sometimes desirable, to replace a portion of the styrene-maleic anhydride resin or carboxylated polyvinyl acetate resin with an extender resin. The extender resin preferred for use in the composition of the invention is an acrylic resin, such as Joncryl 60 from S. C. Johnson Co. It has been found that the use of such an extender resin does not significantly raise the viscosity of the ink composition. For example, an ink composition containing 3% by weight styrene-maleic anhydride resin and 1% by weight of the acrylic resin provides comparable results as a composition containing 4% by weight of a styrene-maleic anhydride resin, but with a lower viscosity.

In formulating the ink compositions of this invention, it is generally preferred to employ the resin system in the form of an aqueous solution or dispersion of the resin in alkaline aqueous media. While the resin system can be added to the balance of the composition which is maintained at a pH of 7.5 or higher, dissolution of the resin in the aqueous system is somewhat more difficult.

As the alkaline medium, use can be made of an aqueous solution of any of a variety of organic or inorganic bases. Preferred bases include alkanolamines containing 1 to 4 carbon atoms (e.g., ethanolamine, diethanolamine, triethanolamine, isopropanolamine, diisopropanolamine, propanolamine, butanolamine, etc.) or ammonium hydroxide. Dilute ammonium hydroxide solutions are most preferred since the relatively high volatility of ammonia brings about more rapid insolubilization of the resin system on drying.

The concentration of the base in the aqueous solution depends upon the particular base employed. In general, use should be made of sufficient base to provide a pH of 7.5 or higher after addition of the resin to solubilize at least part of the resin system.

The quantity of the resin or resins employed in the ink composition can be varied within fairly wide range, consistent with viscosity and pH requirements. It is essential to the practice of the invention that the resin be employed in amounts sufficient to provide an ink viscosity within the range of 1 to 5 centipoise, and preferably 1.4 to 4.0 centipoise as discussd above. For this purpose use in generally made of an amount of the resin system constituting 1 to 10%, and preferably 2 to 4% by weight of the total ink composition. Where use is made of an extender resin it is generally preferred that the extender resin constitute up to 40% by weight, and preferably up to 25% by weight of the total resin component.

It is also essential to the practice of the invention that the resin system be plasticized with a water-soluble glycol and/or glycol ether in order to obtain an image formed by jet printing which is waterinsoluble. In addition, the glycol and/or glycol ether plasticizers used in the practice of the invention serve as humectants to substantially prevent or minimize "tip" drying" of the ink composition in the jet nozzle during down time of the printer.

As the plasticizer use can be made of alkylene glycols in which the alkylene group preferably contain 2 to 6 carbon atoms, as represented by ethylene glycol, propylene glycol, butylene glycol, hexylene glycol, as well as the polyalkylene glycols as represented by diethylene glycol dipropylene glycol, triethylene glycol, tripropylene glycol, tetraethylene glycol. It is possible to employ commercially available polyalkylene glycols, such as Carbowax 200, which is polyethylene glycol having an average molecular weight of about 200. In general, it is preferred, when using polyalkylene glycols, to use those materials having an average molecular weight less than 400 since higher molecular weight polyalkylene glycols frequently serve to undesirably increase the viscosity of the ink composition and drying time of the image on the master.

Use can also be made of the alkyl ether derivatives of the foregoing alkylene glycols as the plasticizer for use in the ink composition of the invention. Preferred glycol ethers are the alkyl ethers of alkylene glycols in which the alkyl group contains 1 to 6 carbon atoms (e.g., methyl, ethyl propyl, butyl, etc.) and the alkylene group contains 2 to 6 carbon atoms. Representative of the foregoing glycol ethers are ethylene glycol methyl ether, ethylene glycol ethyl ether, ethylene glycol butyl ether, ethylene glycol hexyl ether, diethylene glycol methyl ether, diethylene glycol ethyl ether, diethylene glycol butyl ether, propylene glycol methyl ether, dipropylene glycol methyl ether, tripopylene glycol methyl ether, ethoxy triglycol (triethylene glycol ethyl ether), methoxy triglycol (triethylene glycol methyl ether), etc. Mixture of the foregoing glycols and glycol ethers can be used and frequently are preferred.

The total amount of the plasticizer employed in the composition of the invention can be caried within wide limits as dictated by the viscosity consideration of the composition as discussed above. As will be appreciated by those skilled in the art, the amount of the plasticizer employed depends somewhat on the molecular weight of the glycol and/or glycol ether employed. In general, use is made of an amount of plasticizer within the range of 2.5 to 30% by weight, and preferabaly 5 to 30% by weight, based on the total weight of the composition.

As the coloring material, use is preferably made of water-soluble dyes or mixtures of dyes. The water-soluble dyes most preferred for use in the composition of the invention are the dyes known to the art as direct dyes and water-soluble nigrosine dyes which generally contain an ionizable inorganic salt such as a Glauber salt or sodium chloride which has been added during manufacture to standardize the dye lot. The ionizable salt thus imparts the desired conductivity to the ink composition whereby the ink jet is capable of being deflected in an electro field during printing. Such dyes are well known to those skilled in the art and are commercially available, as represented by the C. I. direct black 38 dyes (e.g., Direct Black GW marketed by the Tenneco Color Division of Tennessee Chemicals, Capamine Black ESA marketed by Capitol Color and Chemical Co.) and modified nigrosine dyes such as Calcocid Black SR marketed by American Cyanamid Co. If use is made of a pure dye containing no ionizable material, the desired conductivity can be obtained by adding an ionizable salt to the composition. It is generally preferred that the composition contain sufficient ionizable material to provide a low specific resistivity preferably 50 to 5,000 ohm-cm. This normally corresponds to an ionizable salt content of up to 2% by weight of the composition.

The water-soluble dye or dyes should be employed in a ratio of at least two parts by weight of the resin system per part by weight of dye to insure the desired total image insolubility is obtained on drying of the ink. In general, use is made of a dye in amounts constituting between 0.5 to 5.0% by weight and preferably 1 to 2% by weight, of the total composition.

It is generally advisable to avoid the use of pigments or other particulate matter in the composition of the invention since such particulate matter may serve to clog the jet orifice or nozzle. However, it is possible and frequently desirable to use small quantities of aquablack pigments, which are water-dispersed carbon blacks, such as the Aquablack marketed by the Columbia Carbon Co., to enhance the infrared response of the ink during drying, particularly in applications where drying of the image is accelerated by use of an external heat source such as an infrared lamp or the like. When use is made of such pigments, they generally constitute between 0.25 and 2.0% by weight of the composition.

While the aqueous alkaline solution of the resin system formulated into the composition of the invention is usually sufficient to maintain the pH of the total composition on the alkaline side, where long periods of storage or recirculation through the jet printer trough are anticipated, it is advantageous to formulate the ink composition of the invention to include a solubilizing organic base, such as morpholine or the alkanolamines, such as diethanolamine, monoethanolamine, diisopropanolamine, monoisopropanolamine, triethanolamine, etc., and mixtures thereof in order to maintain the pH greater than 8, and preferably within the range of 8 to 10 during such periods and thereby maintain the solubility of the resin system and the water-soluble dye component. The amount of the solubilizing base employed for this purpose is generally an amount constituting up to about 5% by weight of the composition.

The ink composition can also be formulated to include an anti-bacterial preservative when extended periods of storage are anticipated to prevent or minimize the growth of bacteria in the composition which might otherwise serve to cause agglomeration of the resin or soluble ink composition. For this purpose, use can be made of up to about 1% by weight of any of a variety of known preservatives, such as Dioxin (6-acetoxy-2,4-dimethyl-m-dioxane).

In preparing the ink composition of the invention, the components are thoroughly mixed to provide a uniform mixture, and then the composition is filtered to remove any particulate matter in the composition to insure that the nozzle of the printer will remain unobstructed during the printing operation. It is generally preferred that the composition be filtered to remove particulate matter having sizes greater than 10 microns in diameter.

In use, the jet printing operation is carried out in a conventional manner using the ink composition of this invention. The ink is preferably deposited on a direct image master, and allowed to dry whereby the resin system which is soluble in alkaline media is rendered insoluble as the alkaline media of the ink is removed by volatilization or evaporation. The printed master can be air-dried at ambient temperatures, although it is generally preferred to accelerate drying and removal of the alkaline media by heating the imaged master to fix the printed images defined by the resin system on the surface thereof.

Having described the basic concepts of the invention, reference is now made to the following examples which are provided by way of illustration, and not of limitation of the practice of the invention in the formulation of ink compositions embodying the concepts of the invention:

EXAMPLE 1

A styrene-maleic anhydride resin (SMA 1440 H) is dissolved in aqueous alkaline media by incorporating the resin in dilute ammonium hydroxide solution to form the following composition:

| | |
|---|---|
| Styrene-maleic anhydride resin | 15% by weight |
| NH₄OH (26° Be) | 5% by weight |
| Water | 80% by weight |

Thereafter, the foregoing composition is incorporated into the following ink composition:

| | |
|---|---|
| Styrene-maleic anhydride | 3.0% by weight (dry weight) |
| Dioxin | 0.1% by weight |
| Dipropyleneglycol | 8.0% by weight |
| Direct Black GX | 1.0% by weight |
| Calcocid Black SR | 0.5% by weight |
| Aquablack "55" (25% solids) | 0.5% by weight |
| Water | Balance |

The foregoing composition is then filtered using a 1 micron filter, and is found to provide good results in use in a jet printer.

EXAMPLE 2

Using the procedure described in Example 1, the following ink composition is prepared:

| | |
|---|---|
| Styrene-maleic anhydride resin | 3.0% by weight (dry weight) |
| Diethylene glycol methyl ether | 7.5% by weight |
| Direct Black GX | 2.0% by weight |
| Water | Balance |

EXAMPLE 3

Using the procedure described in Example 1, the following ink composition is prepared:

| | |
|---|---|
| Styrene-maleic anhydride resin | 3.0% by weight (dry wt.) |
| Dipropylene glycol methyl ether | 7.0% by weight |
| Morpholine | 0.5% by weight |
| Dioxin | 0.1% by weight |
| Direct Black GX | 1.4% by weight |
| Aquablack "55"(25% solids) | 0.5% by weight |
| Water | Balance |

EXAMPLE 4

Using the procedure of Example 1, the following ink composition is prepared:

| | |
|---|---|
| Styrene-maleic anhydride resin | 3.5% by weight (dry weight) |
| Methoxy triglycol | 4.5% by weight |
| Triethylene glycol | 4.5% by weight |
| Morpholine | 0.5% by weight |
| Direct Black GX | 2.0% by weight |
| Water | Balance |

EXAMPLE 5

The styrene-maleic anhydride resin solubilized in ammonium hydroxide employed in Example 1 and an acrylic extender resin solution (Joncryl 60) are used in this example in accordance with the procedure described in Example 1.

The resulting alkaline mixture of resins is then formulated into the following ink composition:

| | |
|---|---|
| Styrene-maleic anhydride resin | 3.0% by weight (dry weight) |
| Acrylic extender resin | 1.0% by weight (dry weight) |
| Diethylene glycol butyl ether | 8.0% by weight |
| Direct Black GX | 1.5% by weight |
| Aquablack "55" | 0.5% by weight |

EXAMPLE 6

Using the procedure described in Example 5, the following ink composition is prepared:

| | |
|---|---|
| Styrene-maleic anhydride | 3.0% by weight (dry wt.) |
| Acrylic extender resin | 1.0% by weight (dry wt.) |
| Dioxin | 0.1% by weight |
| Diethylene glycol methyl ether | 4.0% by weight |
| Ethoxytriglycol | 4.0% by weight |
| Dipropylene glycol methyl ether | 4.0% by weight |
| Morpholine | 0.5% by weight |
| Methyl pyrrolidone | 1.0% by weight |
| Direct Black 38 | 1.38% by weight |
| Acid Black 1 | .12% by weight |
| Water | Balance |

EXAMPLE 7

The styrene-maleic anhydride employed in Example 1 is dissolved in aqueous alkaline media by formulating the resin into the following composition:

| | |
|---|---|
| Styrene-maleic anhydride resin | 18% by weight |
| Ammonium hydroxide (0.1 N) | 5% by weight |
| Water | 77% by weight |

The foregoing solution is then formulated into the following ink composition:

| | |
|---|---|
| Styrene-maleic anhydride resin | 4.0% by weight (dry weight) |
| Diethylene glycol | 8.5% by weight |
| Direct Black GX | 1.8% by weight |
| Water | Balance |

EXAMPLE 8

A styrene-maleic anhydride resin of the type employed in Example 1 is dissolved in aqueous alkaline media by formulating the resin into the following composition:

| | |
|---|---|
| Styrene-maleic anhydride resin | 15% by weight |
| Ethanolamine | 10% by weight |
| Water | 75% by weight |

The foregoing solution is then formulated into the following ink composition:

| | |
|---|---|
| Styrene-maleic anhydride resin | 4.0% by weight (dry weight) |
| Polyethylene glycol (MW 200) (Carbowax 200) | 4.5% by weight |
| Ethoxytriglycol | 4.5% by weight |
| N-methyl pyrrolidone | 1.0% by weight |
| Direct Black GX | 1.75% by weight |
| Water | Balance |

The foregoing composition is filtered in the manner described in Example 1, and found to provide good results.

EXAMPLE 9

Using the procedure described in Example 1, an ink composition is formulated as follows:

| | |
|---|---|
| Carboxylated polyvinylacetate (Gelva C5V16) | 3.5% by weight |
| Diethylene glycol | 7.0% by weight |
| Direct Black 38 | 1.5% by weight |
| Water | Balance |

The foregoing composition is found to provide good results in a jet printer.

It will be apparent that various changes and modifications can be made in the details of procedure, formulation, and use without departing from the spirit of the invention, especially as defined in the following claims.

We claim:

1. An ink composition for use in jet printing for preparation of offset masters consisting essentially of an aqueous alkaline solution of a water-soluble direct dye, at least one resin which is soluble in aqueous alkaline media with a pH of at least 7.5, but insoluble in aqueous media with a pH under 7.0, and is hydrophobic on drying, said resin being selected from the group consisting of styrene-maleic anhydride resins and their ester derivatives, and a water-soluble plasticizer for the resin selected from the group consisting of alkylene glycols, polyalkylene glycols, their corresponding alkyl ethers and mixtures thereof.

2. A composition as defined in claim 1 wherein the resin is a mixture of the styrene-maleic anhydride resin and a water-soluble acrylic extender resin.

3. A composition as defined in claim 1 wherein the resin is added to the composition in the form of an aqueous solution containing a base.

4. A composition as defined in claim 3 wherein the base is selected from the group consisting of an ammonium hydroxide and an alkanolamine.

5. A composition as defined in claim 3 wherein the base is present in an amount sufficient to maintain the pH of the composition of at least 7.5.

6. A composition as defined in claim 3 wherein the base is ammonium hydroxide.

7. A composition as defined in claim 1 wherein the resin constitutes from 1 to 10% by weight of the composition.

8. A composition as defined in claim 1 wherein the composition has a viscosity in the range of 1 to 10 centipoise at 25° C.

9. A composition as defined in claim 1 wherein the glycols and glycol ethers have average molecular weights less than 400.

10. A composition as defined in claim 1 wherein the plasticizer constitutes from 2.5 to 30% by weight of the composition.

11. A composition as defined in claim 1 wherein the dye contains an ionizable material in an amount sufficient to provide a specific resistivity of 50 to 5,000 ohm-cm.

12. A composition as defined in claim 1 wherein the dye constitutes from 0.5 to 5% by weight of the composition.

13. A composition as defined in claim 1 which includes dispersed carbon black.

14. A composition as defined in claim 1 which includes a solubilizing organic base to maintain the pH of the composition.

15. A composition as defined in claim 1 which includes a preservative.

16. An ink composition for use in jet printing for preparation of offset masters consisting essentially of an aqueous alkaline solution of a water-soluble direct dye, at least one resin which is soluble in aqueous alkaline media with a pH of at least 7.5, but insoluble in aqueous media with pH under 7.0, and is hydrophobic on drying, said resin being selected from the group consisting of styrene-maleic anhydride resins and their ester derivatives and carboxylated polyvinyl acetate resins, and a water-soluble plasticizer for the resin selected from the group consisting of alkylene glycols, polyalkylene glycols, their corresponding alkyl ethers and mixtures thereof.

17. A composition as defined in claim 16 wherein the composition has a viscosity within the range of 1 to 10 centipoise at 25° C.

18. An ink composition for use in jet printing consisting essentially of an aqueous alkaline solution containing 0.5 to 5% by weight of a water-soluble direct dye containing an ionizable material in an amount sufficient to provide a specific resistivity of 50 to 5000 ohm (cm), 1 to 10% by weight of at least one resin which is soluble in aqueous alkaline media with a pH of at least 7.5, but insoluble in aqueous media with a pH under 7.0, and is hydrophobic on drying, said resin being selected from the group consisting of styrene-maleic anhydride resins and their ester derivatives and carboxylated polyvinyl acetate resins, and from 2.5 to 30% by weight of a water soluble plasticizer for the resin selected from the group consisting of alkylene glycols, polyalkylene glycols, their corresponding alkyl ethers and mixtures thereof, with the glycols and glycol ethers having an average molecular weight less than 400, with the ink composition having a viscosity within the the range of 1 to 10 centipoise at 25° C.

* * * * *